ized patents.

(12) United States Patent
Xie et al.

(10) Patent No.: US 11,490,178 B2
(45) Date of Patent: Nov. 1, 2022

(54) METHOD FOR ESTABLISHING SERVICE PATH, NETWORK DEVICE, AND SYSTEM

(71) Applicant: HUAWEI TECHNOLOGIES CO., LTD., Guangdong (CN)

(72) Inventors: Gang Xie, Wuhan (CN); Hao Li, Wuhan (CN); Haomian Zheng, Shenzhen (CN); Zhe Liu, Wuhan (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/344,536

(22) Filed: Jun. 10, 2021

(65) Prior Publication Data
US 2021/0306724 A1    Sep. 30, 2021

Related U.S. Application Data

(63) Continuation of application No. PCT/CN2018/120215, filed on Dec. 11, 2018.

(51) Int. Cl.
*H04Q 11/00* (2006.01)

(52) U.S. Cl.
CPC . *H04Q 11/0062* (2013.01); *H04Q 2011/0079* (2013.01); *H04Q 2011/0086* (2013.01); *H04Q 2011/0088* (2013.01)

(58) Field of Classification Search
CPC .......................... H04Q 11/0062; H04L 12/66
See application file for complete search history.

(56) References Cited

U.S. PATENT DOCUMENTS

| 2011/0205902 A1 | 8/2011 | Zi et al. |
| 2017/0012871 A1 | 1/2017 | Iovanna et al. |

FOREIGN PATENT DOCUMENTS

| CN | 1449163 A | 10/2003 |
| CN | 101102521 A | 1/2008 |

(Continued)

OTHER PUBLICATIONS

Casellas et al., "Overarching Control of Flexi Grid Optical Networks: Interworking of GMPLS and OpenFlow Domains", Journal of Lightwave Technology, vol. 33, No. 5, Mar. 2015 (Year: 2015).*

(Continued)

*Primary Examiner* — Shi K Li
(74) *Attorney, Agent, or Firm* — Fish & Richardson P.C.

(57) ABSTRACT

This application provides example methods for establishing a service path in a transport network and example systems. One example method includes, obtaining, by an automatically switched optical network (ASON) first node, a service path computation result path. The service path includes the ASON first node, an ASON last node, and at least one first edge network node. The method also includes sending, by the ASON first node, a path establishment request message to a downstream node. The path establishment request message carries cross-connection configuration information of the ASON last node and the at least one first edge network node. The method further includes receiving, by the ASON first node, a path establishment response message of the downstream node. The path establishment response message indicates that cross-connection configuration for the ASON last node and the at least one first edge network node is complete.

20 Claims, 14 Drawing Sheets

(56) References Cited

FOREIGN PATENT DOCUMENTS

| | | | |
|---|---|---|---|
| CN | 101247664 A | 8/2008 |
| CN | 102098591 A | 6/2011 |
| CN | 102158300 A | 8/2011 |
| CN | 103688497 A | 3/2014 |
| CN | 105745881 A | 7/2016 |
| EP | 3038303 A1 | 6/2016 |
| WO | 2015042824 A1 | 4/2015 |
| WO | 2016149897 A1 | 9/2016 |
| WO | 2017066923 A1 | 4/2017 |

OTHER PUBLICATIONS

Vasseur et al., RFC-5152, "A Per-Domain Path Computation Method for Establishing Inter-Domain Traffic Engineering (TE) Label Switched Paths (LSPs)", IETF, Feb. 2008 (Year: 2008).*

Awduche et al., RFC-3209, "RSVP-TE: Extensions to RSVP for LSP Tunnels", IETF, Dec. 2001 (Year: 2001).*

Extended European Search Report issued in European Application No. 18942675.2 dated Dec. 6, 2021, 12 pages.

PCT International Search Report and Written Opinion issued in International Application No. PCT/CN2018/120215 dated Sep. 10, 2019, 15 pages.

Office Action issued in Chinese Application No. 201880099725.7 dated Mar. 17, 2022, 9 pages.

Office Action issued in Chinese Application No. 201880099725.7 dated Aug. 16, 2022, 4 pages.

* cited by examiner

METHOD FOR ESTABLISHING SERVICE PATH, NETWORK DEVICE, AND SYSTEM

CROSS-REFERENCE TO RELATED APPLICATIONS

This application is a continuation of International Application No. PCT/CN2018/120215, filed on Dec. 11, 2018, which is hereby incorporated by reference in its entirety.

TECHNICAL FIELD

This application relates to the communications field, and in particular, to a method for establishing a service path, a network device, and a system.

BACKGROUND

An automatically switched optical network (ASON) function has been implemented in a metropolitan area network and a core backbone network. In the metropolitan area network and the core backbone network, because a transport device has a strong hardware capability, a generalized multi-protocol label switching (GMPLS) protocol can normally start and run on a device, and an end-to-end service path can be automatically established by using resource reservation protocol-traffic engineering (RSVP-TE) of the GMPLS protocol.

However, in an edge network, a hardware capability of an edge network device is relatively weak, and hardware resources such as a central processing unit (CPU) and a memory cannot meet a requirement of a protocol such as GMPLS. Therefore, a service path of the edge network device cannot be automatically configured by using the GMPLS protocol, and can only be manually configured by using a network management system. FIG. 1 shows a network architecture across an edge network and a metropolitan area/core network (ASON). As shown in FIG. 1, when a service path from an edge network node A to an edge network node L is to be created, the service path needs to pass through three sections: a path A-B-D in an edge network 1, a path D-E-F-I in a metropolitan area/core network 2, and a path I-J-L in an edge network 3. For the path D-E-F-I in the metropolitan area/core network 2, a network management system delivers a command for creating a service D-I to a first node D. The first node D may establish cross-connections along the service path D-E-F-I hop by hop by using RSVP-TE signaling, and automatically establish an end-to-end service path. For the path A-B-D in the edge network 1 and the path I-J-L in the edge network 2, because the edge network device does not support the GMPLS protocol, cross-connections of a service path can only be configured node by node by using the network management system. The service path of the edge network is manually configured by using the network management system. This is inefficient and is prone to errors, resulting in low service provisioning efficiency.

SUMMARY

In view of this, this application provides a method for establishing a service path, a network device, and a system, to resolve a problem of low service provisioning efficiency.

According to a first aspect, this application provides a method for establishing a service path in a transport network, and the service path passes through an automatically switched optical network ASON and at least one edge network. A first node of the service path in the ASON is referred to as an ASON first node, a last node in the ASON is referred to as an ASON last node, and the service path passes through at least one first edge network node in the edge network. The at least one first edge network node is within a control scope of the ASON last node. The method includes the following steps: The ASON first node obtains a service path computation result, where the service path includes the ASON first node, the ASON last node, and the at least one first edge network node; the ASON first node sends a path establishment request message to a downstream node, where the path establishment request message carries cross-connection configuration information of the ASON last node and the at least one first edge network node, so that the ASON last node configures a cross-connection for the at least one first edge network node; and the ASON first node receives a path establishment response message of the downstream node, where the path establishment response message indicates that cross-connection configuration for the ASON last node and the at least one first edge network node is complete. In this embodiment of the present disclosure, the cross-connection configuration information of the at least one first edge network node is carried in the path establishment request message through an extended service path establishment protocol (such as an RSVP-TE protocol) of the ASON, so that an end-to-end service path across the ASON and the edge network can be automatically configured, thereby improving service provisioning efficiency and accuracy.

In a possible implementation, the method further includes: The ASON first node sends respective cross-connection configuration information to each of at least one second edge network node. The ASON first node configures a cross-connection for the at least one second edge network node within a control scope of the ASON first node, so that the end-to-end service path across the ASON network and the edge network can be automatically configured, thereby improving service provisioning efficiency and accuracy.

In a possible implementation, the cross-connection configuration information of the at least one first edge network node is indicated by a sub-type-length-value (TLV) of the ASON last node. The ASON last node configures a cross-connection for the at least one first edge network node within the control scope of the ASON last node, so that the end-to-end service path across the ASON and the edge network can be automatically configured, thereby improving service provisioning efficiency and accuracy.

In a possible implementation, the ASON last node is a node that supports an ASON protocol, the at least one first edge network node is a node that does not support the ASON protocol, and the ASON last node is a control node of the at least one first edge network node.

In a possible implementation, the ASON first node is a node that supports an ASON protocol, the at least one second edge network node is a node that does not support the ASON protocol, and the ASON first node is a control node of the at least one second edge network node.

According to a second aspect, this application provides a method for establishing a service path in a transport network, and the service path passes through an automatically switched optical network ASON and at least one edge network. A first node of the service path in the ASON is referred to as an ASON first node, a last node in the ASON is referred to as an ASON last node, and the service path passes through at least one edge network node in the edge network. The at least one edge network node is within a control scope of the ASON last node. The method includes the following steps: The ASON last node receives a path establishment request message from an upstream node, where the path establishment request message carries cross-connection configuration information of the ASON last node and the at least one edge network node, so that the ASON last node configures a cross-connection for the at least one edge network node; and where the service path includes the ASON first node, the ASON last node, and the at least one edge network node; and the ASON last node sends a path establishment response message to the upstream node, where the path establishment response message indicates that cross-connection configuration for the ASON last node and the at least one edge network node is complete. In this embodiment of the present disclosure, the cross-connection configuration information of the at least one edge network node is carried in the path establishment request message through an extended service path establishment protocol (such as an RSVP-TE protocol) of the ASON, so that an end-to-end service path across the ASON and the edge network can be automatically configured, thereby improving service provisioning efficiency and accuracy.

In a possible implementation, the method further includes: The ASON last node sends respective cross-connection configuration information to each of the at least one edge network node.

In a possible implementation, the cross-connection configuration information of the at least one edge network node is indicated by a sub-type-length-value (TLV) of the ASON last node. The ASON last node configures a cross-connection for the at least one edge network node within the control scope of the ASON last node, so that the end-to-end service path across the ASON and the edge network can be automatically configured, thereby improving service provisioning efficiency and accuracy.

In a possible implementation, the ASON last node is a node that supports an ASON protocol, the at least one edge network node is a node that does not support the ASON protocol, and the ASON last node is a control node of the at least one edge network node.

In a possible implementation, when the ASON last node is a secondary control node of the at least one edge network node, the method further includes: The ASON last node sends the cross-connection configuration information of the at least one edge network node to a primary control node of the at least one edge network node.

According to a third aspect, this application provides an automatically switched optical network ASON device, where the device includes an obtaining unit, a sending unit, and a receiving unit, and is configured to perform the method according to any one of the first aspect or the possible implementations of the first aspect.

According to a fourth aspect, this application provides an automatically switched optical network ASON device, where the device includes a receiving unit and a sending unit, and is configured to perform the method according to any one of the second aspect or the possible implementations of the second aspect.

According to a fifth aspect, this application provides a network system, where the system includes the ASON device according to any one of the third aspect or the possible implementations of the third aspect, and the ASON device according to any one of the fourth aspect or the possible implementations of the fourth aspect.

Another aspect of this application provides a readable storage medium, where the readable storage medium stores an instruction, and when the instruction is run on an ASON device, the ASON device performs the methods in the foregoing aspects.

Another aspect of this application provides an executable program product including an instruction, and when the executable program product runs on an ASON device, the ASON device performs the methods in the foregoing aspects.

In the embodiments of the present disclosure, for the following terms, refer to the following explanations:

A node may represent an independent hardware entity in a network, for example, may be a transport network device such as a switch or a router.

A link may represent a connection relationship between two adjacent nodes, and a protocol message and/or traffic data can be forwarded between the two nodes by using the link. The link may be indicated by a node-interface pair, for example, a link (node 1-interface 1, node 2-interface 2) indicates that the protocol message and/or the traffic data may be sent from an interface 1 of a node 1 and received on an interface 2 of a node 2.

An interface may represent a physical port or a logical port that is on a node and that is configured to send/receive a protocol message and/or traffic data.

A service may represent a physical connection between a source node (or a first node or a start node) and a sink node (or a last node or a destination node), and traffic data may be sent from the source node and received on the sink node.

A service path includes each node and link that a service passes through from a source node to a sink node.

Cross-connection configuration means to establish a connection relationship between an inbound interface and an outbound interface of nodes, and the connection relationship may be a connection relationship of unidirectional transmission or a connection relationship of bidirectional transmission. Cross-connection configuration is also referred to as cross configuration.

Cross-connection configuration information is used to indicate a node to establish a cross-connection between an inbound interface and an outbound interface, and may include outbound interface information (for example, an outbound link identifier and an outbound label), and optionally may further include inbound interface information (for example, an inbound link identifier and an inbound label).

BRIEF DESCRIPTION OF DRAWINGS

To clearly describe the technical solutions of the embodiments of the present disclosure, the following briefly describes the accompanying drawings used in describing the embodiments.

DESCRIPTION OF EMBODIMENTS

To make the objectives, technical solutions, and advantages of the present disclosure clearer and more comprehensible, the following further describes the present disclosure in detail with reference to the accompanying drawings and embodiments.

Figure 1:
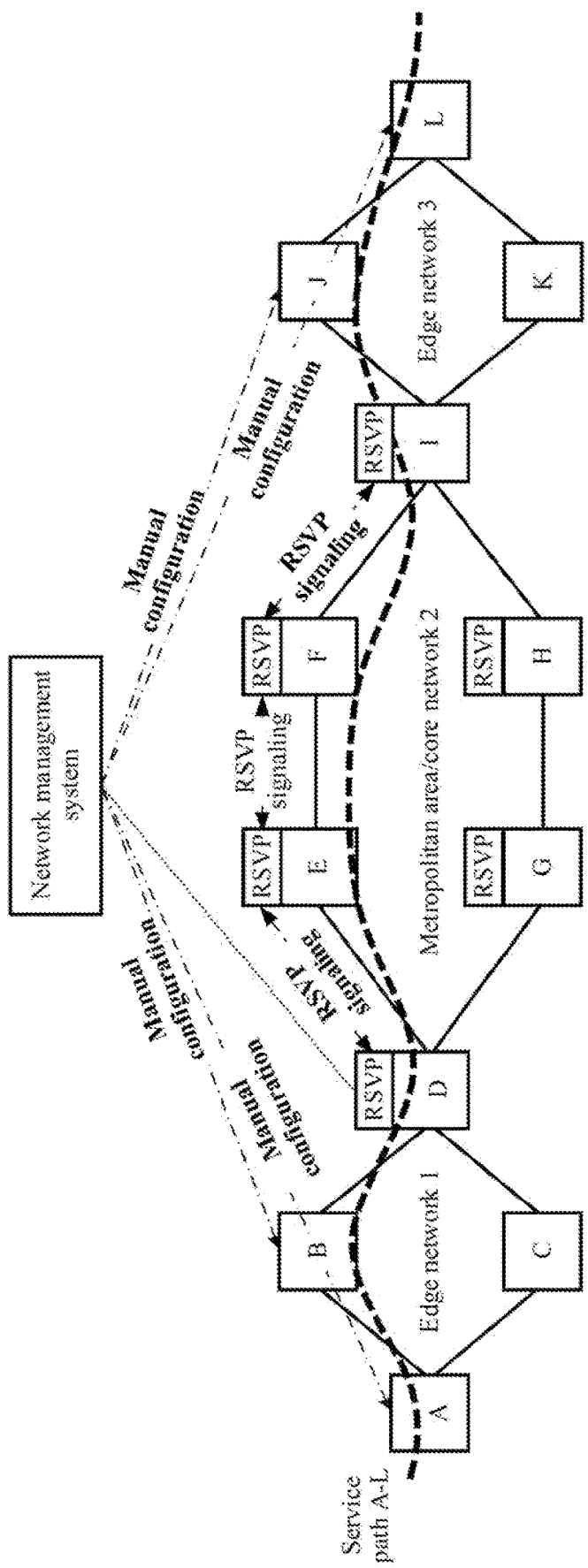
FIG. 1 is a schematic diagram of a network architecture in the current technology.
Figure 2:
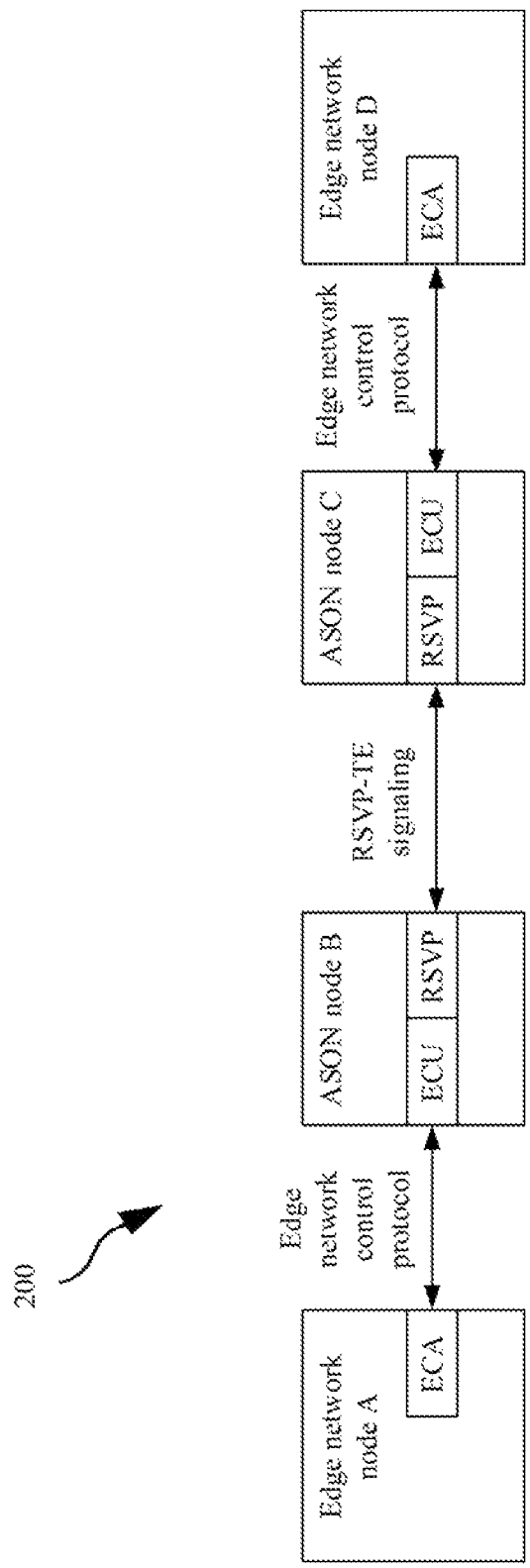
FIG. 2 is a schematic diagram of a network architecture according to an embodiment of the present disclosure.

FIG. 2 is a schematic diagram of a network architecture according to an embodiment of the present disclosure. As shown in FIG. 2, a network architecture 200 includes a node A, a node 13, a node C, and a node D. The nodes B and C are metropolitan area/core network nodes, and support an ASON/GMPLS protocol. The nodes A and D are edge network nodes, and cannot support the ASON protocol due to insufficient hardware resources. The metropolitan area/core network nodes B and C may also be referred to as ASON nodes. The ASON/GMPLS protocol supported by the metropolitan area/core network nodes B and C includes open shortest path first (OSPF), a constrained shortest path first (CSPF), RSVP-TE, and the like. For example, the ASON node may obtain information, such as resource information such as a node and a link, about another node in an entire network through OSPF. The ASON node may further compute an end-to-end service path through CSPF and establish the end-to-end service path by using RSVP-TE signaling. An edge control agent (ECA) is configured for the edge network nodes A and D, and an edge control unit (ECU) is configured for the ASON nodes B and C. The ECA is mainly configured to collaborate with the ECU to implement an automation capability (including automatic discovery and service configuration) of the edge network node. For example, the ECA may report resource information such as a node and a link of the edge network to the ECU, and collaborate with the ECU to configure a service for the edge network node. The ECU performs centralized control on the edge network to complete topology discovery (automatic discovery of the edge network node) and automatic service configuration of the edge network. The service configuration may include processes such as service establishment, deletion, modification, and recovery. For example, the ECU may discover the edge network node according to an automatic route discovery mechanism, or may collect the resource information such as the node and the link of the edge network through an edge control protocol, and configure a service for the edge network node, and the like. An RSVP control apparatus is further configured for the nodes B and C, to run the RSVP-TE signaling to automatically configure an end-to-end service. In the current technology, because the edge network node cannot support automatic service configuration, configuration can only be manually performed by using a network management system. In the embodiments of the present disclosure, the ECU may automatically configure a service for the edge network node, thereby improving service provisioning efficiency and accuracy. The following describes the technical solutions of the embodiments of the present disclosure by using different application scenarios.

Figure 3:
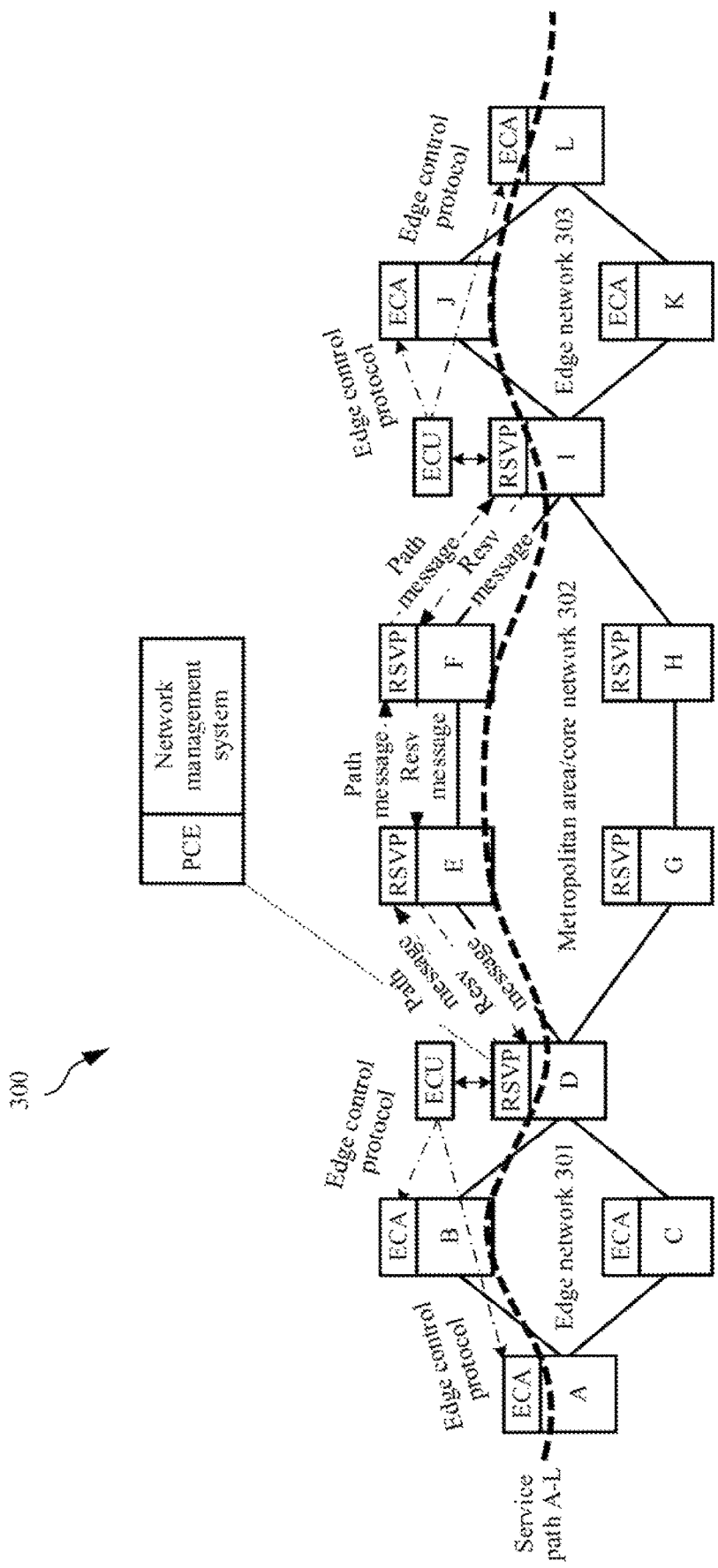
FIG. 3 is a diagram of a network architecture of an application scenario according to an embodiment of the present disclosure.
Figure 4:
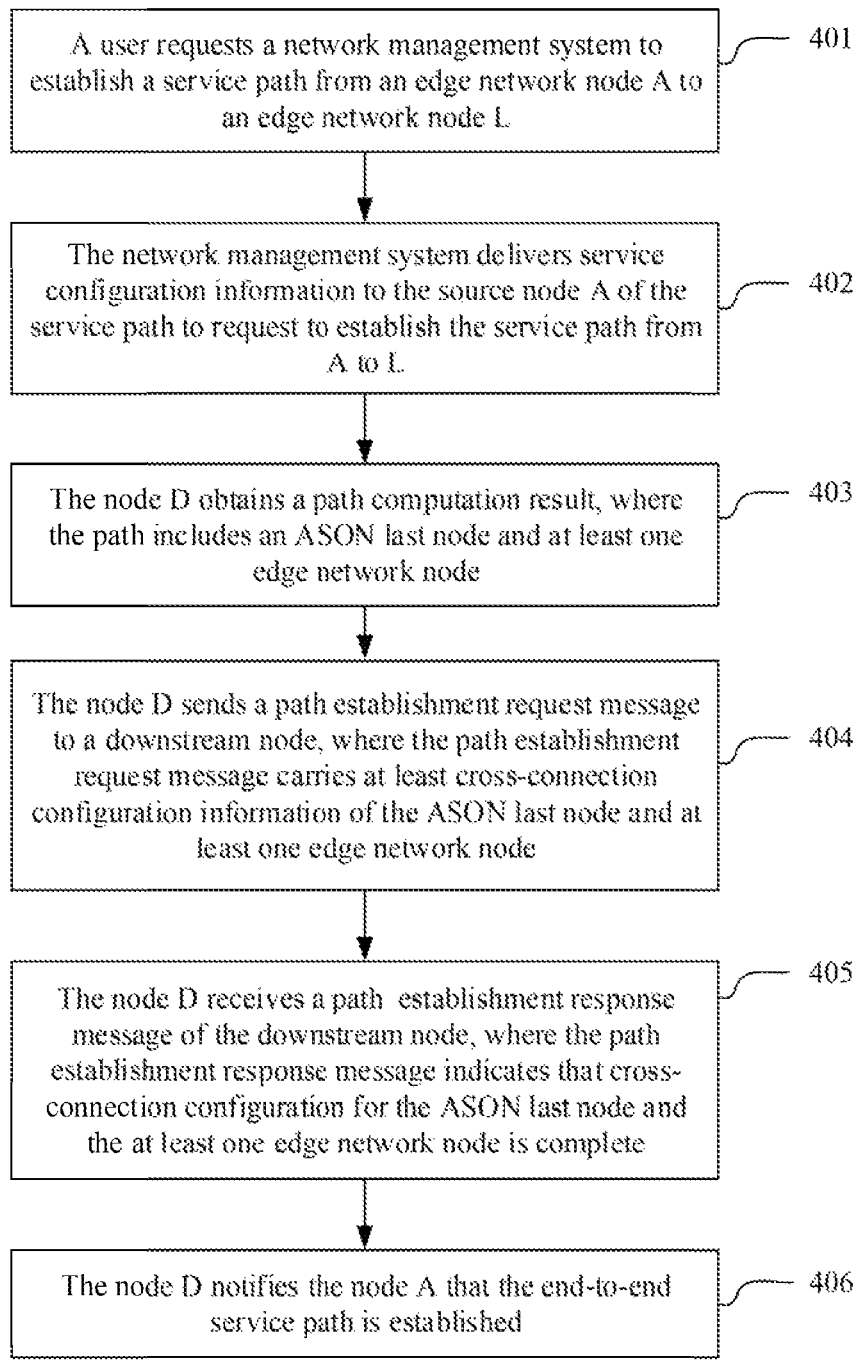
FIG. 4 is an example flowchart of a method for establishing a service path according to an embodiment of the present disclosure.

FIG. 3 is a diagram of a network architecture of an application scenario according to an embodiment of the present disclosure. As shown in FIG. 3, a network architecture 300 includes an edge network 301, a metropolitan area/core network 302, and an edge network 303. The edge network 301 and the edge network 303 do not support an ASON protocol, the edge network 301 includes edge network nodes A, B, and C, and the edge network 303 includes edge network nodes J, K, and L. The metropolitan area/core network 302 supports the ASON protocol, and the metropolitan area/core network 302 includes ASON nodes D, E, F, G, H, and I. The metropolitan area/core network 2 is also referred to as an ASON or a GMPLS network. An ECA may be deployed for the edge network node, for example, the ECA is deployed for each of the edge network nodes A, B, C, J, K, and L. An ECU may be deployed for the ASON node, for example, the ECU is deployed for the ASON nodes D and I connected to the edge network. Functions of the ECA and the ECU are similar to those in FIG. 2. Details are not described herein. The edge network nodes A, B, and C are located within a control scope of the ASON node D. As a control node of the edge network nodes A, B, and C, the ASON node D can discover the edge network nodes A, B, and C according to an automatic route discovery mechanism. The edge network nodes J, K, and L are located in a control scope of the ASON node I. As a control node of the edge network nodes J, K, and L, the ASON node I can discover the edge network nodes J, K, and L according to the automatic route discovery mechanism. The ASON nodes D, E, F, G, H, and I can discover each other according to the automatic route discovery mechanism (an OSPF protocol). Optionally, the network architecture 300 may further include a path computation element (PCE) that may be deployed on a network management system or any network device (such as the ASON node). The PCE automatically obtains information such as a node, a link, and a service of an entire network through OSPF or through a path computation element communication protocol (PCEP), to implement centralized service path computation. If there is no PCE in the network architecture, distributed service path computation may be implemented by using a plurality of network nodes or all network nodes. Optionally, the network architecture 300 may further include the network management system, and the network management system may be a server, a controller, or the like. In this embodiment of the present disclosure, a service may be automatically configured through an extended RSVP-TE protocol. The following uses establishment of a service path A-B-D-E-F-I-J-L across the edge network 301, the metropolitan area/core network 302, and the edge network 303 as an example for description. FIG. 4 is an example flowchart of a method for establishing a service path according to an embodiment of the present disclosure. The method includes the following steps.

Step 401: A user requests a network management system to establish a service path from the edge network node A to the edge network node L.

The user may send a service path establishment request message to the network management system. The request message carries a source node A and a sink node L of the service path, and optionally may further carry bandwidth between A and L, a service level agreement (SLA), and the like.

Step 402: The network management system delivers service configuration information to the source node A of the service path to request to establish the service path from A to L.

The service configuration information may include the source node A and the sink node L of the service path, and may further include information such as the bandwidth and the SLA. The edge network node A is configured as an ECA, and does not have a path computation capability. In addition, the edge network node A is located within a management scope of the ASON node D (an ECU), in other words, the node D is a control node of the node A. The node A may request through an edge control protocol, the node D to compute an end-to-end service path from A to L. For example, the node A sends, to the node D through a constrained application protocol (COAP), service configuration information specified by the user, namely, information such as the source node A, the sink node L, and the bandwidth. Optionally, if the node A has the path computation capability, the node A may alternatively directly compute the end-to-end service path from A to L. For example, the node A may compute a service path A-B-D-E-F-I-J-L through CSPF.

Step 403: The node D obtains a path computation result, where the path includes an ASON last node and at least one edge network node.

If the node A (the ECA) does not have the path computation capability, the node D (the ECU) receives a service path request from the node A. If there is a PCE in a network, the node D (the ECU) may request, through a PCEP, the PCE to compute the end-to-end service path from A to L, and obtain a service path computation result A-B-D-E-F-I-J-L from the PCE. Optionally, the path computation result further includes information such as a timeslot and a wavelength. If there is no PCE in the network, the node D (the ECU) may alternatively compute the service path. If the node A (the ECA) has the path computation capability, the node D (the ECU) may receive the path computation result from the node A. In A-B-D-E-F-I-J-L, A-B-D and I-J-L are sub-paths in an edge network, and D-E-F-I is a sub-path in a metropolitan area/core network. Nodes A, B, J, and L are edge network nodes, and nodes D, E, F, and I are ASON nodes. The edge network nodes A and B are within a control scope of the node D (the ECU), and the edge network nodes J and L are within a control scope of the node I (an ECU). In the service path A-B-D-E-F-I-J-L, the node A is a source node of a service, the node L is a sink node of the service, the node D is an ASON first node, and the node I is an ASON last node.

Step 404: The node D sends a path establishment request message to a downstream node, where the path establishment request message carries at least cross-connection configuration information of the ASON last node and at least one edge network node.

After the node D (the ECU) obtains the service path computation result A-B-D-E-F-I-J-L, the node D (the ECU) allocates a service session ID. The session ID is unique on this node and is used to identify the service path.

The sub-path A-B-D belongs to the edge network, and a service of the sub-path A-B-D is directly configured by the node D (the ECU) through the edge control protocol, for example, the node D (the ECU) configures cross-connections for the nodes A and B station by station through the constrained application protocol (COAP). A cross-connection configuration message sent by the node D to the nodes A and B may include inbound interface information and outbound interface information. The inbound interface information may include one or more of a subrack, a slot, a port, a channel (a timeslot or a wavelength), and the like of an inbound interface. The inbound interface information may also include an inbound link identifier, and the inbound link identifier may indicate a subrack, a slot, and a port of the inbound interface. The outbound interface information may include one or more of a subrack, a slot, a port, a channel (a timeslot or a wavelength), and the like of an outbound interface. The outbound interface information may also include an outbound link identifier, and the outbound link identifier may indicate a subrack, a slot, and a port of the outbound interface.

The sub-path D-E-F-I belongs to the metropolitan area/core network (supporting a GMPLS/ASON protocol), and a sub-path J-L belongs to the edge network. Cross-connections may be configured for nodes J and L through an extended RSVP-TE protocol. Cross-connections are configured hop by hop by using the node D as a first node of RSVP-TE signaling (namely, the ASON first node) and the node I as a last node of the RSVP-TE signaling (namely, the ASON last node).

Figure 5:
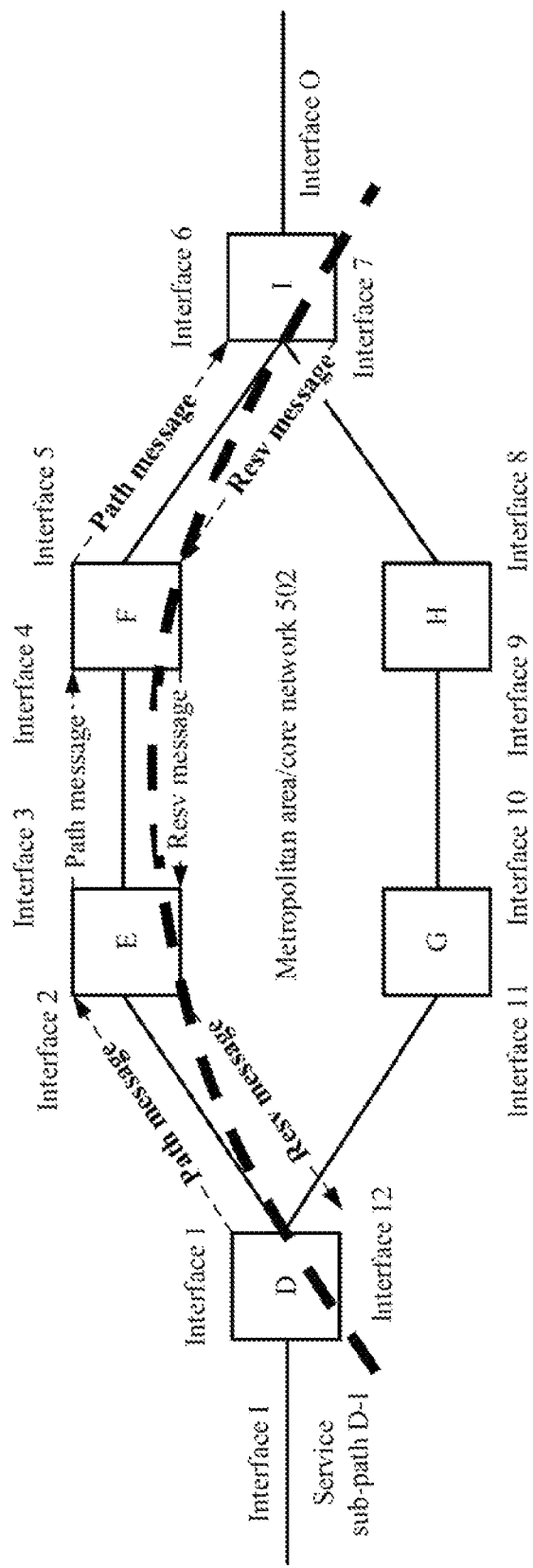
FIG. 5 is a schematic diagram of service path configuration performed by using RSVP-TE signaling according to an embodiment of the present disclosure.

FIG. 5 is a schematic diagram of service path configuration performed by using RSVP-TE signaling according to an embodiment of the present disclosure. The ASON first node D performs forward cross-connection configuration for the ASON last node I hop by hop. As shown in FIG. 5, the node D sends a path message to a downstream node E, and the path message carries at least cross-connection configuration information of the ASON last node I. Optionally, the path message may further carry cross-connection configuration information of each ASON intermediate node, for example, nodes E and F. The cross-connection configuration information of the ASON node may include outbound interface information of the ASON node, for example, an outbound link identifier and an outbound label (namely, a channel number), and may be carried by an explicit route object (ERO). Before sending the path message, the node D may establish a cross-connection from an interface I to an interface 1. Optionally, the path message may further carry cross-connection configuration information of other downstream nodes, for example, the nodes E and F. The node D sends the path message to an interface 2 of the downstream node E by using the interface 1 of the node D. If the path message carries the cross-connection configuration information of the node E, the node E establishes a cross-connection from the interface 2 to an interface 3 based on the cross-connection configuration information in the path message. The node E sends the path message to an interface 4 of the downstream node F by using the interface 3. After receiving the path message, similar to the node E, the node F establishes a cross-connection from the interface 4 to an interface 5, and sends the path message to the node I. After receiving the path message, similar to the node F, the node I establishes a cross-connection from an interface 6 to an interface O. The nodes D, E, and F may establish cross-connections before sending the path message to adjacent downstream nodes, or may establish cross-connections after sending the path message, or may establish cross-connections after receiving Resv messages from adjacent downstream nodes. The node I may establish the cross-connection before sending the Resv message, or may establish the cross-connection after sending the Resv message.

Because the edge network nodes J and L do not support the ASON protocol (in other words, cannot receive or send the path message), cross-connection configuration information of the nodes J and L may be carried in an ERO object of the ASON last node I. In other words, in addition to the cross-connection configuration information of the node I, the cross-connection configuration information of the node I may further include the cross-connection configuration information of the nodes J and L. For example, basic configuration information (for example, outbound interface information of the nodes J and L) of an edge network sub-path I-J-L is carried in the ERO object of the node I as sub-type-length-value (TLV) information. A specific extended TLV format is as follows:

<ASON node E HOP> object;
<ASON node F HOP> object;
<ASON node I HOP> object;
<Edge network node J HOP> object;
<Edge network node L HOP> object.

Figure 6:
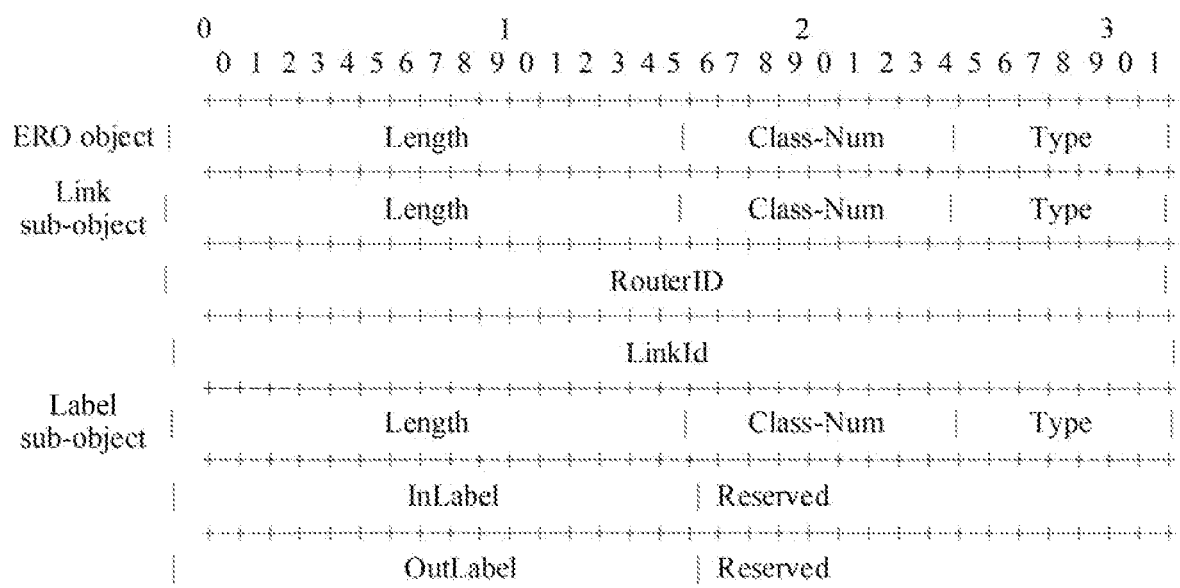
FIG. 6 is a schematic diagram of an extended packet format of a path message according to an embodiment of the present disclosure.

FIG. 6 is a schematic diagram of an extended packet format of a path message according to an embodiment of the present disclosure. A meaning of a specific field is shown in Table 1.

TABLE 1

| Field name | Meaning | Value |
| --- | --- | --- |
| Length | A total object length in units of bytes | A 16-byte value |
| Class-Num | Identify an object class, where each object class has a name | An 8-byte value |
| Type | An object type, which is unique in Class-Num, where an extended field value indicates an edge hop type | An 8-byte value |
| RouterID | Node ID address | A 32-byte value |
| LinkID | Outbound link ID | A 32-byte value |
| InLabel | An inbound label, indicating a channel/wavelength | A 16-byte value |
| Reserved | A reserved byte | A 16-byte value |
| OutLabel | An outbound label, indicating a channel/wavelength | A 16-byte value |
| Reserved | A reserved byte | A 16-byte value |

As shown in FIG. 6, in a packet format of the path message, an ERO object field of the node I may carry information such as an edge path length (Length), an edge HOP type (Type), an outbound link (LinkID), and an outbound label (OutLabel). The ERO object field of the node I may carry the cross-connection configuration information of the node I, and may further carry the cross-connection configuration information of the network nodes J and L. For example, the cross-connection configuration information of the node I may include outbound interface information, for example, an outbound link identifier and an outbound label (namely, a channel number). The cross-connection configuration information of the nodes J and L may include outbound interface information, such as a node ID, an outbound link, and an outbound label. The outbound link may indicate a subrack, a slot, and a port of an outbound interface, and the outbound label may indicate a channel (a timeslot or a wavelength). In the path message, inbound interface information (an inbound link and an inbound label) of the nodes I, J, and L is optional because the node I can determine the inbound interface information of the nodes I, J, and L based on outbound interface information of respective upstream nodes of the nodes I, J, and L.

The sub-path I-J-L belongs to the edge network, and a service of the sub-path I-J-L is directly configured by the node I (the ECU) by using the edge control protocol. For example, the node I (the ECU) obtains the cross-connection configuration information of the edge network nodes J and L from the path message, and configures cross-connections for the nodes J and L station by station through the COAP. A cross-connection configuration message sent by the node I (the ECU) to the nodes J and L may include inbound interface information and outbound interface information. The inbound interface information and the outbound interface information of the nodes J and L are similar to the inbound interface information and the outbound interface information of the nodes A and B that are sent by the node D.

Step 405: The node D receives a path establishment response message of the downstream node, where the path establishment response message indicates that cross-connection configuration for the ASON last node and the at least one edge network node is complete.

After configuring the cross-connections for the edge network nodes J and L, the ASON last node I performs reverse cross-connection configuration on the ASON first node D hop by hop. For example, as shown in FIG. 5, the ASON last node I forwards a Resv message to the ASON first node D hop by hop. After receiving a Resv message of RSVP-TE signaling, the ASON first node D determines that service configuration for a sub-path D-E-F-I-J-L is complete. In addition, the node D (the ECU) also determines that service configuration for the sub-path A-B-D is complete. In this case, it may be determined that service configuration for the end-to-end service path A-B-D-E-F-I-J-L is complete. In an end-to-end service creation process, a service configuration sequence of the sub-path A-B-D and the sub-path D-E-F-I-J-L is controlled by the node D (the ECU), and the two service paths may be concurrently or successively established. A sequence of the two service paths is not limited.

Step 406: The node D notifies the node A that the end-to-end service path is established.

After receiving, from the node D, the message indicating that the service path is successfully established, the source node A of the service stores service path information and sends, to the network management system, a response message indicating that the service path is successfully established.

In this embodiment of the present disclosure, the ASON node (the ECU) completes service configuration (cross-connection configuration) for the edge network through the extended RSVP-TE protocol and the edge control protocol, and can automatically configure the end-to-end service path across the edge network and the ASON, thereby improving service provisioning efficiency and accuracy.

Figure 7:
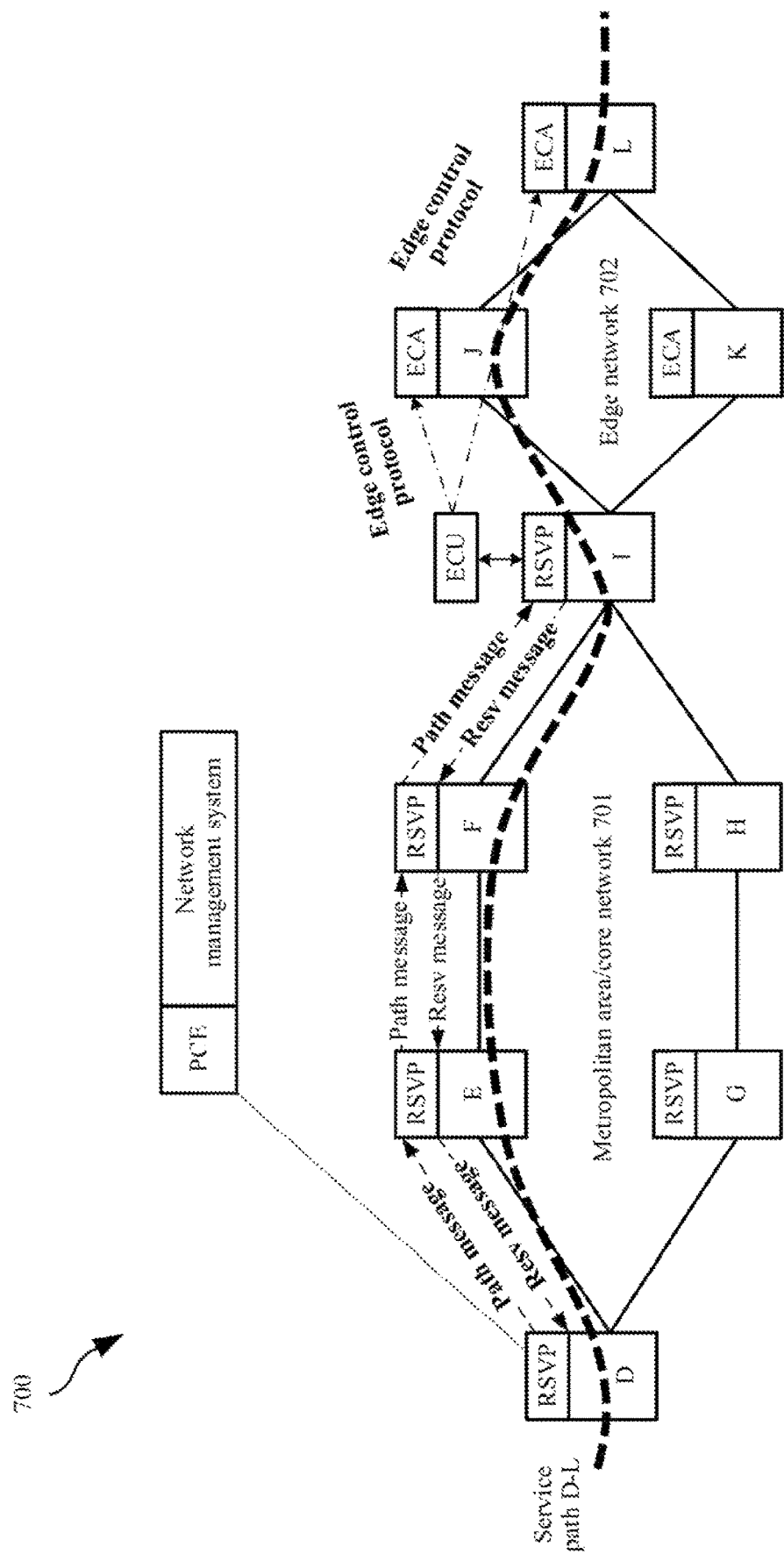
FIG. 7 is a diagram of a network architecture of an application scenario according to an embodiment of the present disclosure.
Figure 8:
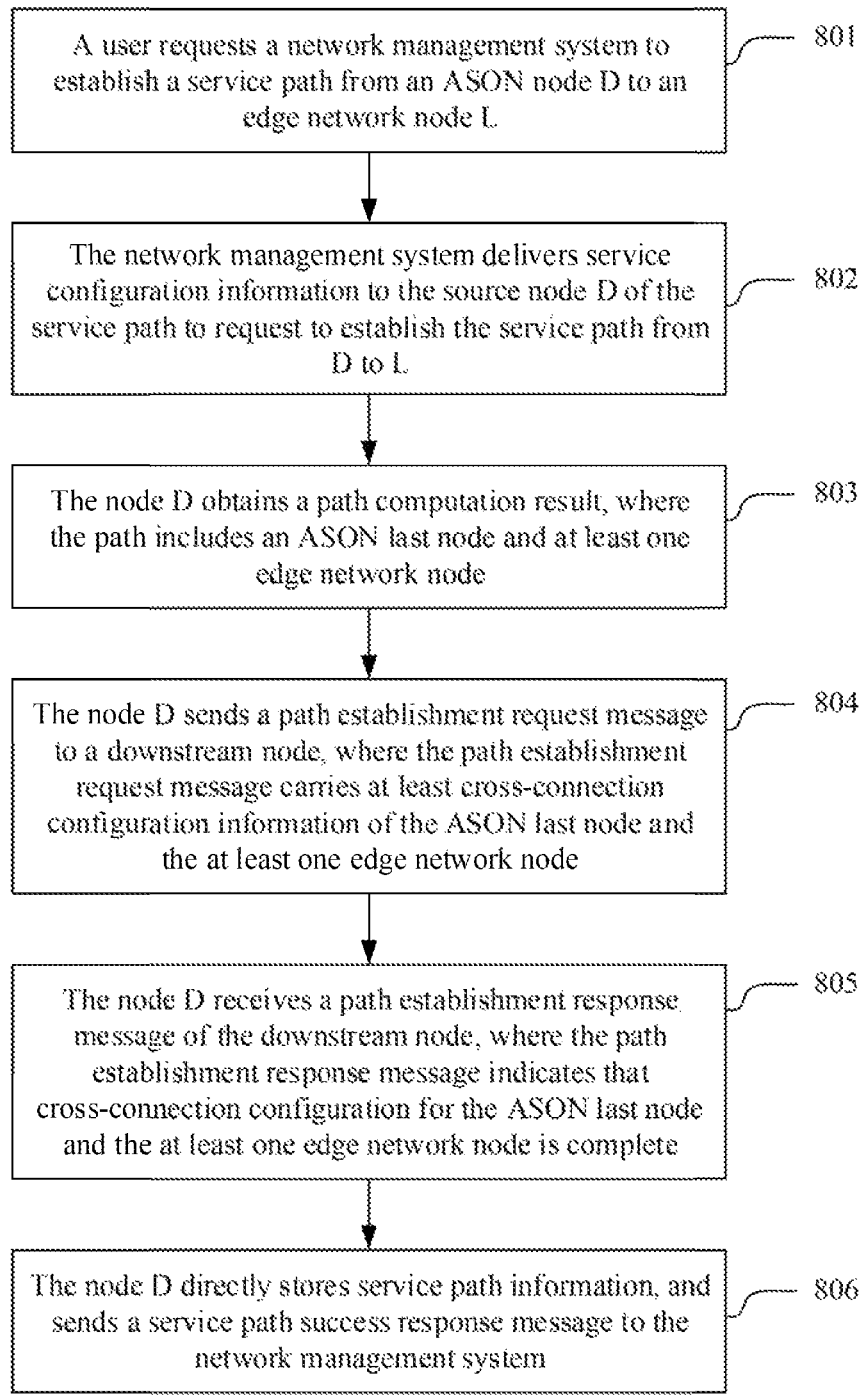
FIG. 8 is an example flowchart of a method for establishing a service path according to an embodiment of the present disclosure.

FIG. 7 is a diagram of a network architecture of an application scenario according to an embodiment of the present disclosure. As shown in FIG. 7, a network architecture 700 includes a metropolitan area/core network 701 and an edge network 702. The edge network on the left in FIG. 3 is absent in FIG. 7. The metropolitan area/core network 701 is similar to the metropolitan area/core network 302 in FIG. 3 and supports an ASON protocol. The metropolitan area/core network 701 includes ASON nodes D, E, F, G, H, and I. The edge network 702 is similar to the edge network 303 in FIG. 3, and does not support the ASON protocol. The edge network 702 includes edge network nodes J, K, and L. An ECU may be deployed for the ASON node, for example, the ECU is deployed for the ASON node I connected to the edge network. An ECA may be deployed for the edge network node, for example, the ECA is deployed for each of the edge network nodes J, K, and L. The edge network nodes J, K, and L are located within a control scope of the ASON node I. As a control node of the edge network nodes J, K, and L, the ASON node I can discover the edge network nodes J, K, and L according to an automatic route discovery mechanism. The ASON nodes D, E, F, G, H, and I can discover each other according to the automatic route discovery mechanism (an OSPF protocol). Optionally, the network architecture 700 may further include a PCE. Similar to FIG. 3, a service may be automatically configured through an extended RSVP-TE protocol. The following uses establishment of a service path D-E-F-I-J-L across the metropolitan area/core network 701 and the edge network 702 as an example for description. FIG. 8 is an example flowchart of a method for establishing a service path according to an embodiment of the present disclosure. The method includes the following steps.

Step 801: A user requests a network management system to establish a service path from the ASON node D to the edge network node L.

This step is different from step 401 in that a source node of the service path is the node D.

Step 802: The network management system delivers service configuration information to the source node D of the service path to request to create the service path from D to L.

This step is different from step 402 in that the node D usually has a path computation capability, and the node D may compute an end-to-end service path D-E-F-I-J-L from D to L or by using a PCE.

Step 803: The node D obtains a path computation result, where the path includes an ASON last node and at least one edge network node.

This step is different from step 403 in that the service path computation result is D-E-F-I-J-L. In this service path, the node D is a source node of a service, and the node L is a sink node of the service.

Step 804: The node D sends a path establishment request message to a downstream node, where the path establishment request message carries at least cross-connection configuration information of the ASON last node and the at least one edge network node.

This step is different from step 404 in that the node D does not need to configure a service for a sub-path A-B-D.

Step 805: The node D receives a path establishment response message of the downstream node, where the path establishment response message indicates that cross-connection configuration for the ASON last node and the at least one edge network node is complete.

This step is different from step 405 in that the node D does not need to confirm whether the service for the sub-path A-B-D is configured.

Step 806: The node D directly stores service path information, and sends a service path success response message to the network management system.

In this embodiment of the present disclosure, the ASON node (an ECU) completes service configuration (cross-connection configuration) for the edge network through an extended RSVP-TE protocol and an edge control protocol, and can automatically configure an end-to-end service path across an ASON and the edge network, thereby improving service provisioning efficiency and accuracy.

Figure 9:
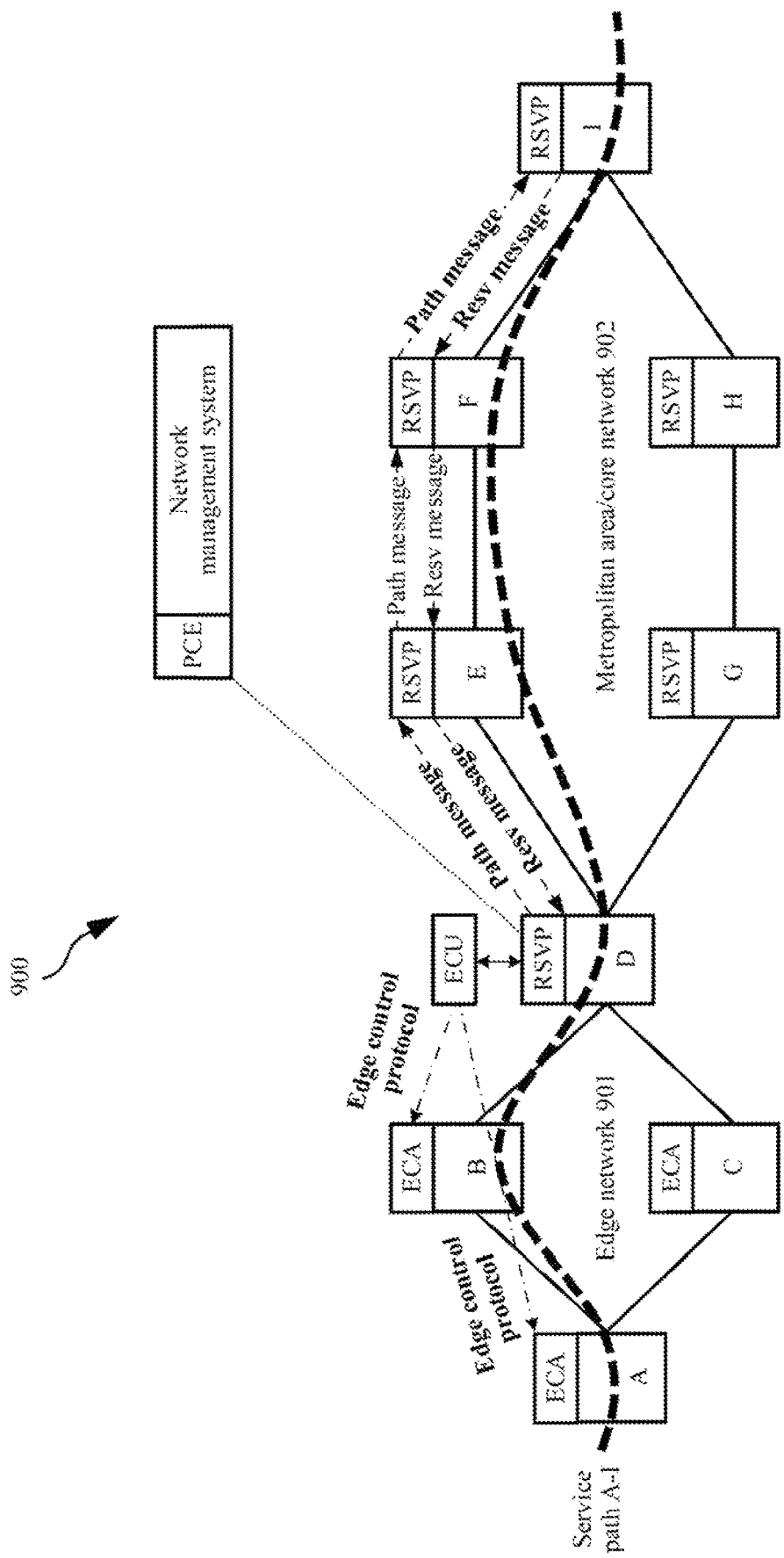
FIG. 9 is a diagram of a network architecture of an application scenario according to an embodiment of the present disclosure.
Figure 10:
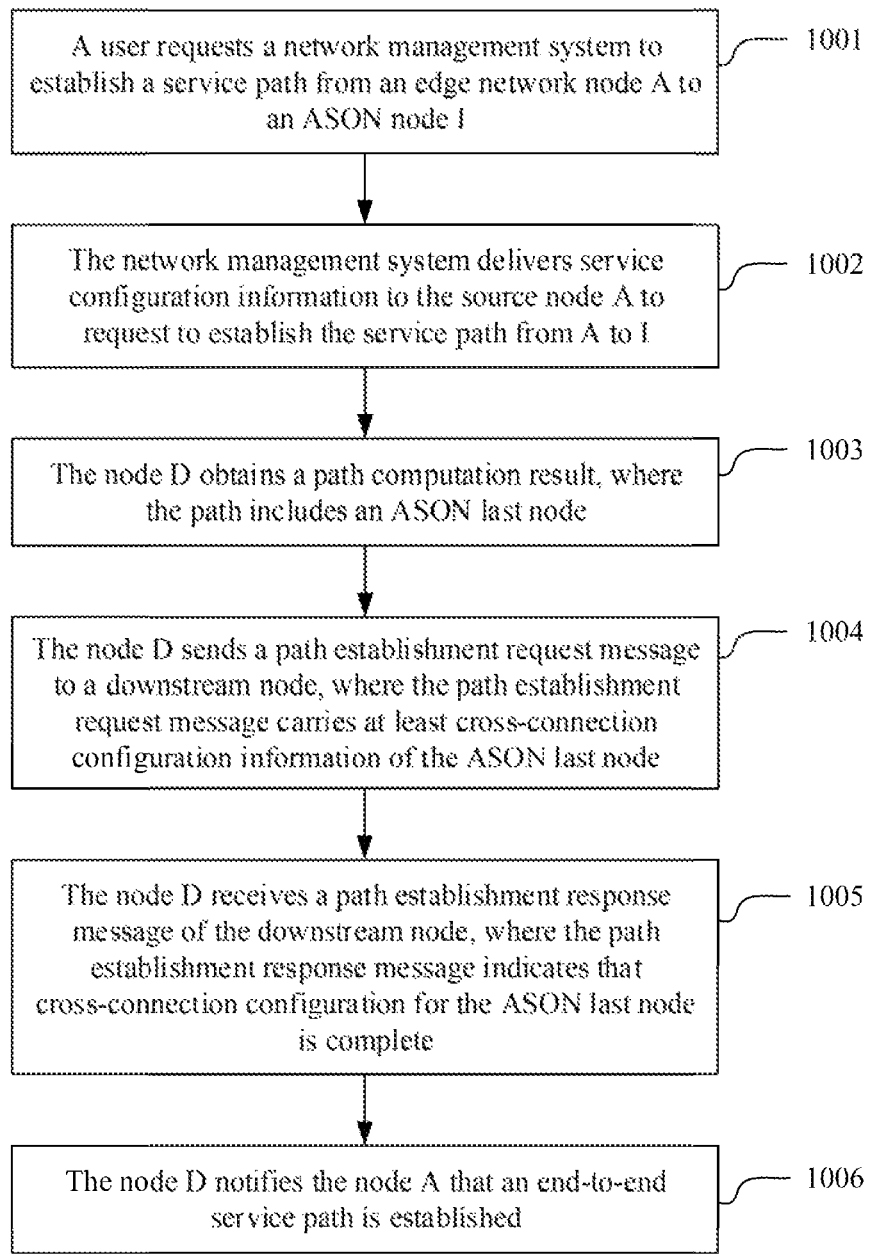
FIG. 10 is an example flowchart of a method for establishing a service path according to an embodiment of the present disclosure.

FIG. 9 is a diagram of a network architecture of an application scenario according to an embodiment of the present disclosure. As shown in FIG. 9, a network architecture 900 includes an edge network 901 and a metropolitan area/core network 902. The edge network on the right in FIG. 3 is absent in FIG. 9. The edge network 901 is similar to the edge network 301 in FIG. 3, and does not support an ASON protocol. The edge network 901 includes edge network nodes A, B, and C. The metropolitan area/core network 902 is similar to the metropolitan area/core network 302 in FIG. 3, and supports the ASON protocol. The metropolitan area/core network 902 includes ASON nodes D, E, F, G, H, and I. An ECA may be deployed for the edge network node, for example, the ECA is deployed for each of the edge network nodes A, B, and C. An ECU may be deployed for the ASON node, for example, the ECU is deployed for the ASON node D connected to the edge network. The edge network nodes A, B, and C are located within a control scope of the ASON node D. As a control node of the edge network nodes A, B, and C, the ASON node D can discover the edge network nodes A, B, and C according to an automatic route discovery mechanism. The ASON nodes D, E, F, G, H, and I can discover each other according to the automatic route discovery mechanism (an OSPF protocol). Optionally, the network architecture 900 may further include a PCE. Similar to FIG. 3, a service may be automatically configured through an extended RSVP-TE protocol. The following uses establishment of a service path A-B-D-E-F-I across the edge network 901 and the metropolitan area/core network 902 as an example for description. FIG. 10 is an example flowchart of a method for establishing a service path according to an embodiment of the present disclosure. The method includes the following steps.

Step 1001: A user requests a network management system to establish a service path from the edge network node A to the ASON node I.

This step is different from step 401 in that a sink node of a service is the node I.

Step 1002: The network management system delivers service configuration information to the source node A to request to establish the service path from A to I.

This step is different from step 402 in that an end-to-end service path is A-B-D-E-F-I.

Step 1003: The node D obtains a path computation result, where the path includes an ASON last node.

This step is different from step 403 in that the service path computation result is A-B-D-E-F-I. In this service path, the node A is the source node of the service, and the node I is the sink node of the service.

Step 1004: The node D sends a path establishment request message to a downstream node, where the path establishment request message carries at least cross-connection configuration information of the ASON last node.

This step is different from step 404 in that the path establishment request message may not carry cross-connection configuration information of edge network nodes J and L, and the node I does not need to configure a cross-connection for the edge network nodes J and L either.

Step 1005: The node D receives a path establishment response message of the downstream node, where the path establishment response message indicates that cross-connection configuration for the ASON last node is complete.

This step is different from step 405 in that the node I determines that service configuration for a sub-path A-B-D and service configuration for a sub-path D-E-F-I are complete.

Step 1006: The node D notifies the node A that the end-to-end service path is established.

This step is different from step 406 in that an end-to-end service path stored by the node D is A-B-D-E-F-I.

In this embodiment of the present disclosure, the ASON node (an ECU) completes service configuration (cross-connection configuration) for the edge network through an edge control protocol, and can automatically configure an end-to-end service path across an ASON and the edge network, thereby improving service provisioning efficiency and accuracy.

Figure 11:
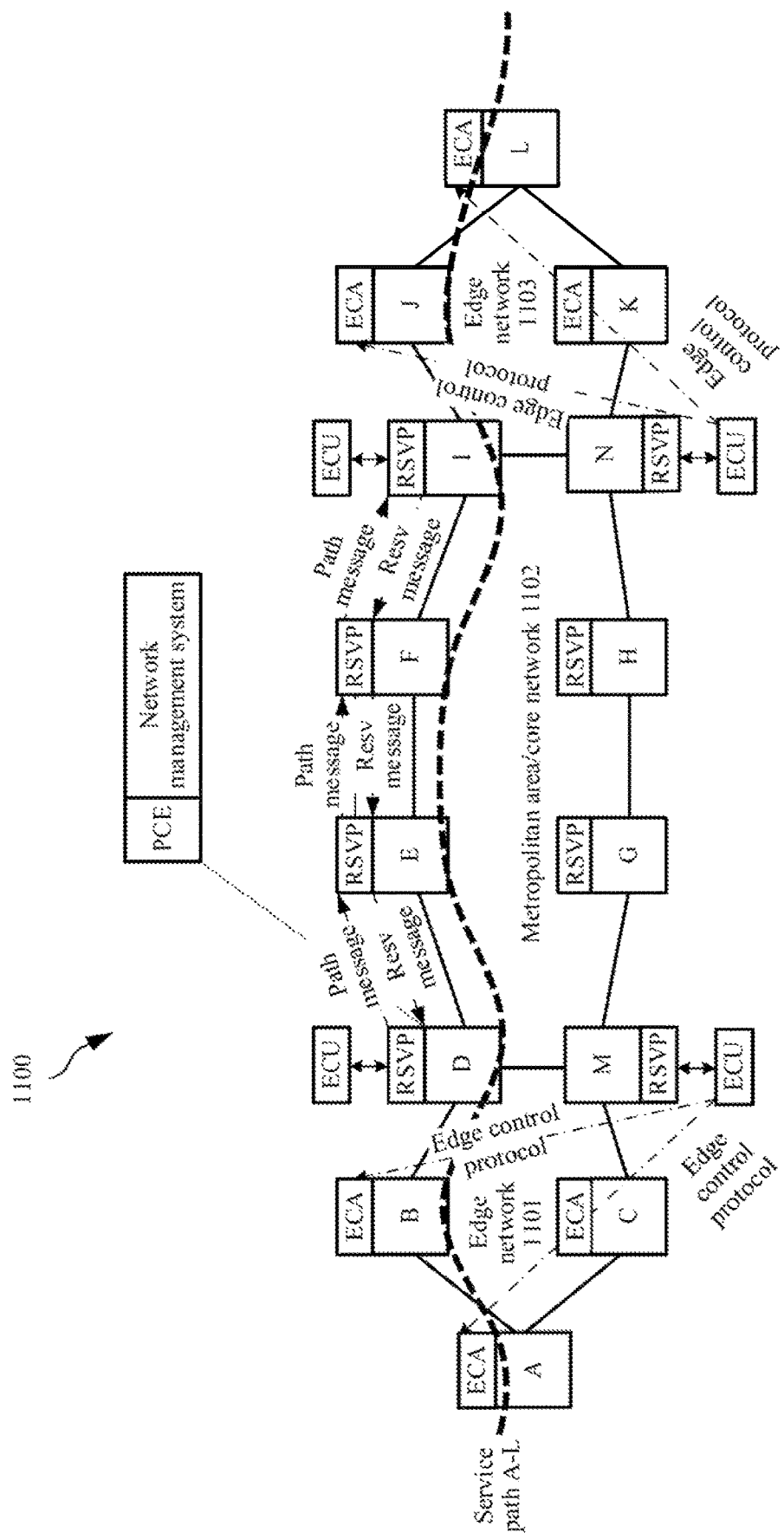
FIG. 11 is a diagram of a network architecture of an application scenario according to an embodiment of the present disclosure.
Figure 12:
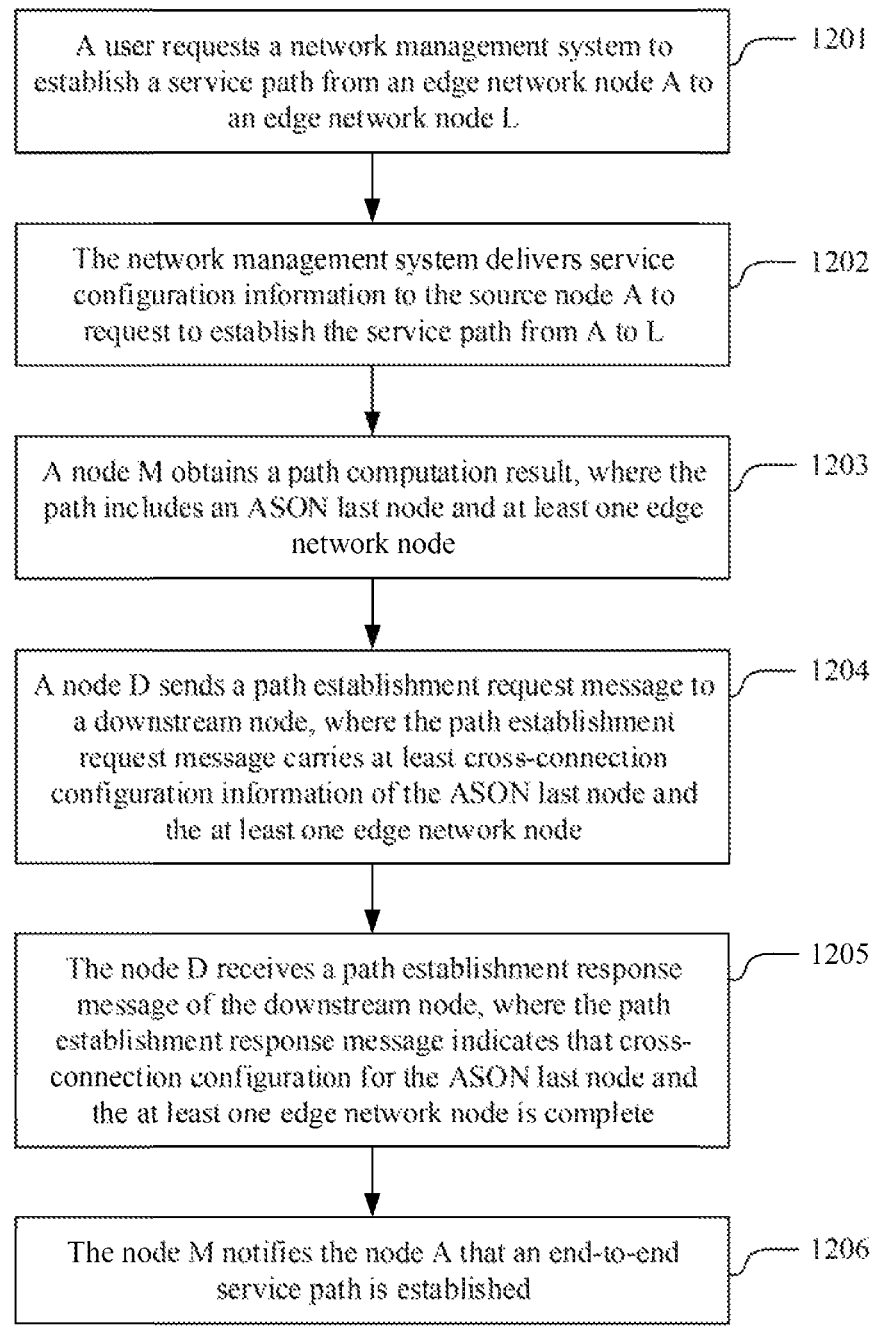
FIG. 12 is an example flowchart of a method for establishing a service path according to an embodiment of the present disclosure.

FIG. 11 is a diagram of a network architecture of an application scenario according to an embodiment of the present disclosure. As shown in FIG. 11, a network architecture 1100 includes an edge network 1101, a metropolitan area/core network 1102, and an edge network 1103. The edge network 1101 and the edge network 1103 do not support an ASON protocol, the edge network 1101 includes edge network nodes A, B, and C, and the edge network 1103 includes edge network nodes J, K, and L. The metropolitan area/core network 1102 supports the ASON protocol, and the metropolitan area/core network 1102 includes ASON nodes D, E, F, G, H, I, M, and N. An ECA may be deployed for the edge network node, for example, the ECA is deployed for each of the edge network nodes A, B, C, J, K, and L. Compared with FIG. 3, FIG. 11 has secondary ECUs. A primary ECU is deployed for the ASON node M, and the secondary ECU is deployed for the ASON node D. The ECUs are a primary ECU and a secondary ECU of each other. The primary ECU is deployed for the ASON node N, and the secondary ECU is deployed for the ASON node I. The ECUs are a primary ECU and a secondary ECU of each other. Configuring the primary and secondary ECUs can increase reliability of the edge network. After the primary ECU fails, the secondary ECU can still control the edge network. Topology information and service information of the edge network are synchronized to primary and secondary ECU control nodes through an edge control protocol. However, service configuration may be uniformly controlled by the primary ECU, to prevent conflicts caused when a plurality of edge network services are simultaneously configured. The edge network nodes A, B, and C are located within a control scope of the ASON node M/D. As a control node of the edge network nodes A, B, and C, the ASON node M/D can discover the edge network nodes A, B, and C according to an automatic route discovery mechanism. The edge network nodes J, K, and L are located within a control scope of the ASON node N/I. As a control node of the edge network nodes J, K, and L, the ASON node N/I can discover the edge network nodes J, K, and L according to the automatic route discovery mechanism. The ASON nodes D, E, F, G, H, I, M, and N can discover each other according to the automatic route discovery mechanism (an OSPF protocol). In addition, a primary/secondary ECU relationship of M/D is configured for the edge network nodes A, B, and C, and a primary/secondary ECU relationship of N/I is configured for the edge network nodes J, K, and L. Optionally, the network architecture 1100 may further include a PCE. Similar to FIG. 3, a service may be automatically configured through an extended RSVP-TE protocol. The following uses establishment of a service path A-B-D-E-F-I-J-L across the edge network 1101, the metropolitan area/core network 1102, and the edge network 1103 as an example for description. FIG. 12 is an example flowchart of a method for establishing a service path according to an embodiment of the present disclosure. The method includes the following steps.

Step 1201: A user requests a network management system to establish a service path from the edge network node A to the edge network node L.

This step is the same as step 401.

Step 1202: The network management system delivers service configuration information to the source node A to request to establish the service path from A to L.

This step is different from step 402 in that the node A may request the node M (a primary ECU) to compute an end-to-end service path from A to L.

Step 1203: The node M obtains a path computation result, where the path includes an ASON last node and at least one edge network node.

This step is different from step 403 in that the node M (the primary ECU) may obtain a service path computation result A-B-D-E-F-I-J-L or by using a PCE.

Step 1204: The node D sends a path establishment request message to a downstream node, where the path establishment request message carries at least cross-connection configuration information of the ASON last node and the at least one edge network node.

This step is different from step 404 in that after obtaining the service path computation result, the node M (the primary ECU) allocates a session ID, and configures a cross-connection for the nodes A and B.

For a sub-path D-E-F-I-J-L, the node M (the primary ECU) sends path configuration information of D-E-F-I-J-L (for example, carries at least cross-connection configuration information of an ASON last node I and the at least one edge network node) to the node D (a secondary ECU) through a proprietary protocol, and the node D configures a cross-connection for the nodes J and L through an extended RSVP-TE protocol. The node D sends a path message to the downstream node, and cross-connection configuration information of the nodes J and L (for example, an inbound port timeslot or a wavelength of the nodes J and L, or an outbound port timeslot or a wavelength of the nodes J and L) is carried in an ERO object of the node I as sub-TLV information. When receiving the path message, the node I (a secondary ECU) obtains the cross-connection configuration information of the nodes J and L, sends the information to the node N (a primary ECU) through the proprietary protocol, and the node N (the primary ECU) configures the cross-connection for the nodes J and L. After configuration is complete, the node N (the primary ECU) notifies the node I (the secondary ECU) that the configuration is complete. Optionally, the node D (the secondary ECU) may further configure a cross-connection for the nodes A and B, and the node I (the secondary ECU) may configure a cross-connection for the nodes J and L.

Step 1205: The node D receives a path establishment response message of the downstream node, where the path establishment response message indicates that cross-connection configuration for the ASON last node and the at least one edge network node is complete.

This step is different from step 405 in that after receiving a configuration completion notification of the node N (the primary ECU), the node I (the secondary ECU) performs forward cross-connection configuration to the ASON first node D hop by hop. After receiving a path establishment response message (a Resv message), the node D (the secondary ECU) notifies the node M (the primary ECU) that service configuration for the sub-path D-E-F-I-J-L is complete. In addition, the node M (the primary ECU) also determines that service configuration for a sub-path A-B-D is complete. In this case, it may be determined that service configuration for the end-to-end service path A-B-D-E-F-I-J-L is complete.

Step 1206: The node M notifies the node A that the end-to-end service path is established.

This step is different from step 406 in that the node M (the primary ECU) sends a message indicating that the service path is successfully established to the source node A of the service.

In this embodiment of the present disclosure, in a normal network environment, a primary ECU control node configures a service for the edge network. When the primary ECU control node is faulty, a secondary ECU control node configures the service for the edge network, thereby improving network reliability. Service configuration (cross-connection configuration) for the edge network node is completed through the extended RSVP-TE protocol and the edge control protocol, and an end-to-end service path across the edge network and an ASON can be automatically configured, thereby improving service provisioning efficiency and accuracy.

Figure 13:
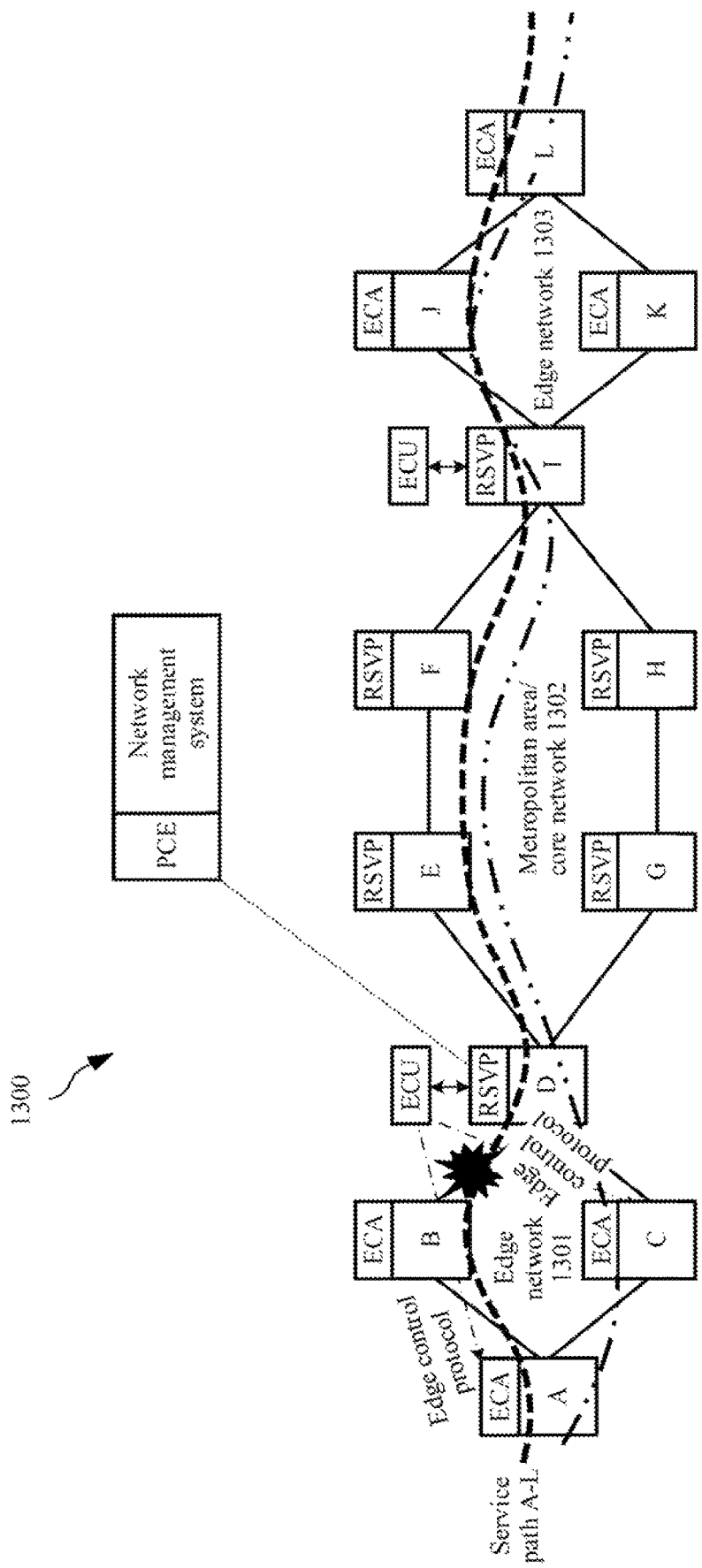
FIG. 13 is a diagram of a network architecture of an application scenario according to an embodiment of the present disclosure.
Figure 14:
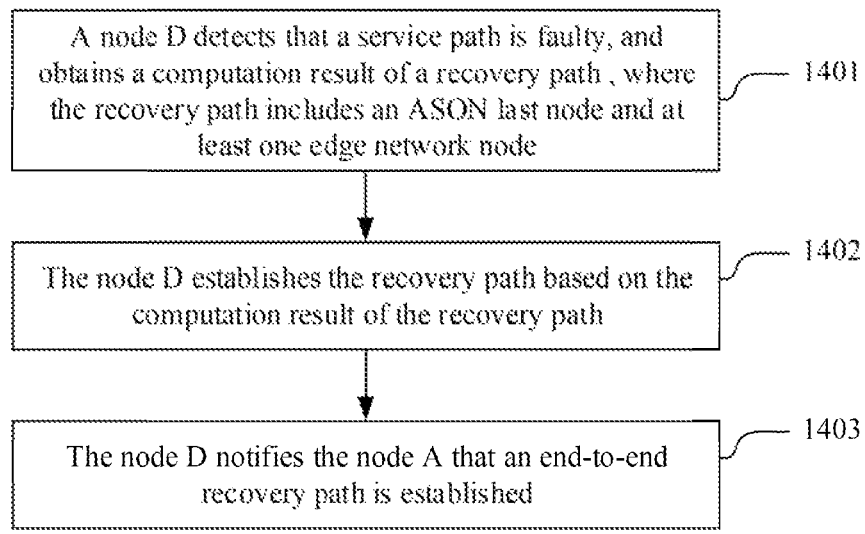
FIG. 14 is an example flowchart of a rerouting method according to an embodiment of the present disclosure.

FIG. 13 is a diagram of a network architecture of an application scenario according to an embodiment of the present disclosure. Based on the established service path A-B-D-E-F-I-J-L in FIG. 3, FIG. 13 shows how to perform rerouting when the service path is faulty. FIG. 14 is an example flowchart of a rerouting method according to an embodiment of the present disclosure. The method includes the following steps.

Step 1401: A node D detects that a service path is faulty, and obtains a computation result of a recovery path, where the recovery path includes an ASON last node and at least one edge network node.

The node D (an ECU) may detect a service path fault, or may detect a service path fault through a fault notification of another node. For example, as shown in FIG. 13, a fiber cut occurs on a link (for example, B-D) in an edge network 1301. After detecting that a port with the fiber cut is faulty, the node B finds an affected service path (for example, A-B-D-E-F-I-J-L) based on an association relationship between the port and a service path. The node B reports information about the faulty port and information about the service path affected by the fault to the control node D of the node B through an edge control protocol (for example, COAP), and requests to recover the service path (in other words, perform rerouting). The node D may compute or request the PCE to compute the recovery path, for example, the recovery path is A-C-D-E-F-I-J-L. In the recovery path, A-B-D and I-J-L are sub-paths in an edge network, and D-E-F-I is a sub-path in a metropolitan area/core network.

If a link (such as E-F) in an ASON 1302 is faulty, the node E reports a fault alarm to the node D through RSVP-TE signaling. If a link (such as J-L) in an edge network 1303 is faulty, the node J notifies the node i (an ECU) of a fault alarm through an edge control protocol, and then the node I reports the fault alarm to the node D through the RSVP-TE signaling.

Step 1402: The node D establishes the recovery path based on the computation result of the recovery path.

When a link B-D in the edge network 1301 is faulty, compared with an original service path A-B-D-E-F-I-J-L, an edge network sub-path A-B-D in the recovery path A-C-D-E-F-I-J-L is changed to A-C-D. Therefore, the node D may reconfigure A-B-D as A-C-D. As described in step 404, a cross-connection for the sub-path A-C-D may be configured through the edge control protocol (for example, COAP). Alternatively, the entire service path A-C-D-E-F-I-J-L may be reconfigured in a same manner in which a new service path is established. For a specific implementation, refer to steps 404 and 405. Details are not described herein.

If a link in the ASON 1302 is faulty, a sub-path D-E-F-I of the ASON may be reconfigured through RSVP-TE signaling in the current technology or extended RSVP-TE signaling in this embodiment of the present disclosure.

If a path in the edge network 1303 is faulty, a sub-path I-J-L in the edge network 1303 may be reconfigured through the extended RSVP-TE signaling in this embodiment of the present disclosure.

Step 1403: The node D notifies the node A that an end-to-end recovery path is established.

In this embodiment of the present disclosure, the ASON node (an ECU) completes service recovery (rerouting) for the edge network through the edge control protocol, and can automatically recover an end-to-end service path across the ASON and the edge network, thereby improving service recovery efficiency and accuracy.

Figure 15:
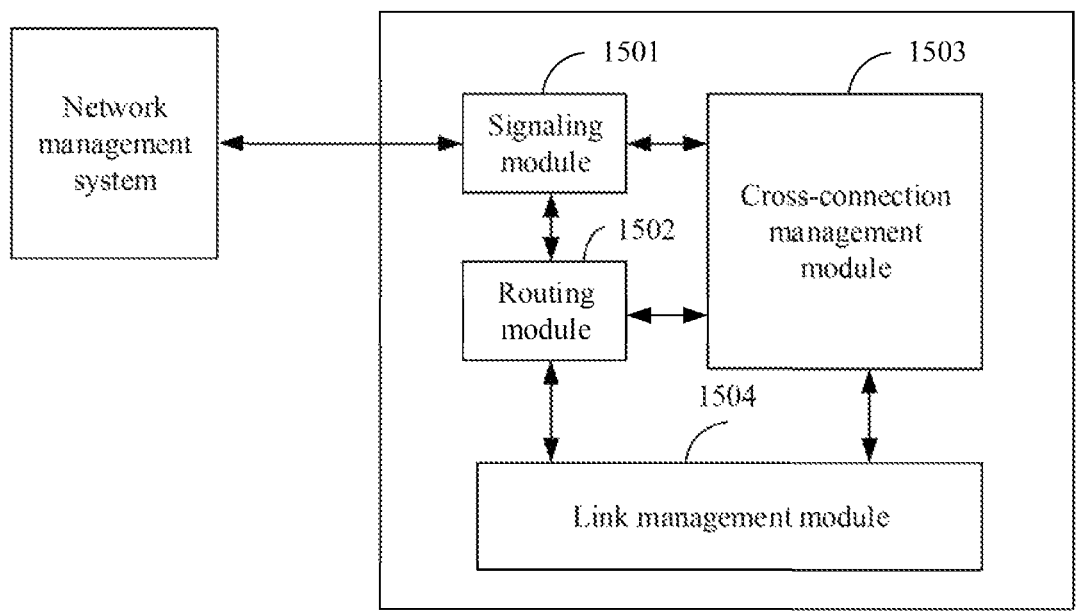
FIG. 15 is a schematic diagram of a logical structure of a network device according to an embodiment of the present disclosure.

FIG. 15 is a schematic diagram of a logical structure of a network device according to an embodiment of the present disclosure. As shown in FIG. 15, a network device 1500 may be an ASON device, such as a switch or a router. The network device 1500 may include a signaling module 1501, a routing module 1502, a cross-connection management module 1503, and a link management module 1504. These modules may be implemented through software, or may be implemented through a combination of software and hardware. The network device 1500 may further include an inbound interface and an outbound interface. The inbound interface and the outbound interface may be physical, or may be logical. The inbound interface and the outbound interface are relative to a service transmission direction. If a service direction on the network device 1500 is bidirectional, the inbound interface may also be an outbound interface, and the outbound interface may also be an inbound interface.

The signaling module 1501 is configured to complete the following functions through an RSVP-TE protocol: establishing or dismantling a service path based on a service path establishment or dismantling request submitted by a user, and providing a service synchronization and recovery function based on a change in a service status. The signaling module 1501 may be connected to a network management system to receive a service establishment command from the network management system.

The routing module 1502 is configured to: collect and flood traffic engineering (TE) link information through an OSPF-TE protocol, collect and flood control link information of a control plane, and compute a service route based on TE link information of an entire network by using a CSPF protocol.

The cross-connection management module 1503 is configured to: establish a cross-connection and delete the cross-connection, and report information such as a link status and an alarm.

The link management module 1504 is configured to create and maintain a control channel and check a TE link through a link management protocol (LMP).

In this embodiment of the present disclosure, the routing module 1502 obtains a service path computation result, the signaling module 1501 sends a path establishment request message and receives a path establishment response message, the path establishment request message and the path establishment response message are transmitted through a control channel established by the link management module 1504, and the cross-connection management module 1503 configures a cross-connection.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for establishing a service path in a transport network, wherein the service path passes through an automatically switched optical network (ASON) and at least one edge network, and wherein the method comprises:
   obtaining, by an ASON first node, a service path computation result, wherein the service path comprises the ASON first node, an ASON last node, and at least one first edge network node;
   sending, by the ASON first node, a path establishment request message to a downstream node, wherein the path establishment request message carries cross-connection configuration information of the ASON last node and the at least one first edge network node, wherein cross-connection of the at least one first edge network node is configured by the ASON last node; and
   receiving, by the ASON first node, a path establishment response message of the downstream node, wherein the path establishment response message indicates that cross-connection configuration for the ASON last node and the at least one first edge network node is complete.

2. The method according to claim 1, wherein the method further comprises:
   sending, by the ASON first node, respective cross-connection configuration information to each of at least one second edge network node.

3. The method according to claim 2, wherein the method further comprises:
   sending, by the ASON first node, respective cross-connection configuration information to each of the at least one second edge network node by an edge control protocol, wherein the edge control protocol is a constrained application protocol (COAP).

4. The method according to claim 2, wherein the ASON first node is a node that supports an ASON protocol, the at least one second edge network node is a node that does not support the ASON protocol, and the ASON first node is a control node of the at least one second edge network node.

5. The method according to claim 1, wherein the cross-connection configuration information of the at least one first edge network node is indicated by a sub-type-length-value (TLV) of the ASON last node.

6. The method according to claim 1, wherein the ASON last node is a node that supports an ASON protocol, the at least one first edge network node is a node that does not support the ASON protocol, and the ASON last node is a control node of the at least one first edge network node.

7. A method for establishing a service path in a transport network, wherein the service path passes through an automatically switched optical network (ASON) and at least one edge network, and wherein the method comprises:
   receiving, by an ASON last node, a path establishment request message from an upstream node, wherein the path establishment request message carries cross-connection configuration information of the ASON last node and at least one edge network node, and the service path comprises an ASON first node, the ASON last node, and the at least one edge network node, wherein cross-connection of the at least one edge network node is configured by the ASON last node; and
   sending, by the ASON last node, a path establishment response message to the upstream node, wherein the path establishment response message indicates that cross-connection configuration for the ASON last node and the at least one edge network node is complete.

8. The method according to claim 7, wherein the method further comprises:
   sending, by the ASON last node, respective cross-connection configuration information to each of the at least one edge network node.

9. The method according to claim 7, wherein the method further comprises:
   sending, by the ASON last node, respective cross-connection configuration information to each of the at least one edge network node by an edge control protocol, wherein the edge control protocol is a constrained application protocol (COAP).

10. The method according to claim 7, wherein the cross-connection configuration information of the at least one edge network node is indicated by a sub-type-length-value (TLV) of the ASON last node.

11. The method according to claim 7, wherein the ASON last node is a node that supports an ASON protocol, the at least one edge network node is a node that does not support the ASON protocol, and the ASON last node is a control node of the at least one edge network node.

12. The method according to claim 11, wherein when the ASON last node is a secondary control node of the at least one edge network node, the method further comprises:
   sending, by the ASON last node, the cross-connection configuration information of the at least one edge network node to a primary control node of the at least one edge network node.

13. A network system, comprising:
an automatically switched optical network (ASON); and
at least one edge network, wherein
  the ASON comprises:
    an ASON first node; and
    an ASON last node, wherein
      the ASON first node comprises:
        at least one first node processor;
        a non-transitory computer-readable first node storage medium coupled to the at least one first node processor and storing first node programming instructions for execution by the at least one first node processor, wherein the first node programming instructions instruct the at least one first node processor to cause the ASON first node to:
          obtain a service path computation result, wherein a service path comprises the ASON first node, the ASON last node, and at least one first edge network node; and
          send a path establishment request message to a downstream node, wherein the path establishment request message carries cross-connection configuration information of the ASON last node and the at least one first edge network node, wherein cross-connection of the at least one first edge network node is configured by the ASON last node, wherein
      the ASON last node comprises:
        at least one last node processor;
        a non-transitory computer-readable last node storage medium coupled to the at least one last node processor and storing last node programming instructions for execution by the at least one last node processor, wherein the last node programming instructions instruct the at least one last node processor to cause the ASON last node to:
          receive the path establishment request message from an upstream node; and
          send a path establishment response message to the upstream node, wherein the path establishment response message indicates that cross-connection configuration for the ASON last node and the at least one first edge network node is complete, and wherein
      the first node programming instructions further instruct the at least one first node processor to cause the ASON first node to:
        receive the path establishment response message of the downstream node.

14. The network system according to claim 13, wherein the first node programming instructions further instruct the at least one first node processor to cause the ASON first node to:
  send respective cross-connection configuration information to each of at least one second edge network node.

15. The network system according to claim 14, wherein the ASON first node is a node that supports an ASON protocol, wherein the at least one second edge network node is a node that does not support the ASON protocol, and wherein the ASON first node is a control node of the at least one second edge network node.

16. The network system according to claim 13, wherein the last node programming instructions further instruct the at least one last node processor to cause the ASON last node to:
  send respective cross-connection configuration information to each of the at least one first edge network node.

17. The network system according to claim 13, wherein the last node programming instructions further instruct the at least one last node processor to cause the ASON last node to:
  send respective cross-connection configuration information to each of the at least one first edge network node by an edge control protocol, wherein the edge control protocol is a constrained application protocol (COAP).

18. The network system according to claim 13, wherein the cross-connection configuration information of the at least one first edge network node is indicated by a sub-type-length-value (TLV) of the ASON last node.

19. The network system according to claim 13, wherein the ASON last node is a node that supports an ASON protocol, wherein the at least one first edge network node is a node that does not support the ASON protocol, and wherein the ASON last node is a control node of the at least one first edge network node.

20. The network system according to claim 19, wherein when the ASON last node is a secondary control node of the at least one first edge network node, the last node programming instructions further instruct the at least one last node processor to cause the ASON last node to:
  send the cross-connection configuration information of the at least one first edge network node to a primary control node of the at least one first edge network node.

* * * * *